(12) United States Patent
Gildea et al.

(10) Patent No.: US 12,462,379 B2
(45) Date of Patent: Nov. 4, 2025

(54) SYSTEM AND METHOD FOR MODEL-BASED STENT DESIGN AND PLACEMENT

(71) Applicants: THE CLEVELAND CLINIC FOUNDATION, Cleveland, OH (US); NEW COS, INC., Cleveland, OH (US)

(72) Inventors: Thomas Gildea, Cleveland, OH (US); Keith Grafmeyer, Cleveland, OH (US)

(73) Assignees: THE CLEVELAND CLINIC FOUNDATION, Cleveland, OH (US); NEW COS, INC., Cleveland, OH (US)

( * ) Notice: Subject to any disclaimer, the term of this patent is extended or adjusted under 35 U.S.C. 154(b) by 632 days.

(21) Appl. No.: 17/626,344

(22) PCT Filed: Jul. 13, 2020

(86) PCT No.: PCT/US2020/041748
§ 371 (c)(1),
(2) Date: Jan. 11, 2022

(87) PCT Pub. No.: WO2021/007570
PCT Pub. Date: Jan. 14, 2021

(65) Prior Publication Data
US 2022/0265353 A1  Aug. 25, 2022

Related U.S. Application Data

(60) Provisional application No. 62/872,754, filed on Jul. 11, 2019.

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01)

(58) Field of Classification Search
CPC ................................. G06T 7/0012; G06T 7/11
See application file for complete search history.

(56) References Cited

U.S. PATENT DOCUMENTS 10,813,776 B2 * 10/2020 Nemes ...................... A61F 2/88
2003/0197734 A1 * 10/2003 Binkert .................. G06Q 10/10
715/771

(Continued)

FOREIGN PATENT DOCUMENTS

CN      105748179 A     7/2016
JP      H10201854 A     8/1998

(Continued)

OTHER PUBLICATIONS

Garcia-Uceda Juarez A. et al., Automatic Airway Segmentation in chest CT using Convolutional Neural Networks (Year: 2018).*

(Continued)

*Primary Examiner* — Kevin Ky
(74) *Attorney, Agent, or Firm* — Tarolli, Sundheim, Covell & Tummino LLP (57) ABSTRACT

Systems and methods are provided for designing a stent for placement within an airway of a patient. Computer executable instructions are executable by a processor to provide an image segmenter, a graphic user interface, and a model generator. The image segmenter segments at least one image of a region of interest to provide a three-dimensional airway model representing at least a portion of the airway. The graphic user interface prompts a user to select a plurality of locations at an within the airway model and a corresponding plurality of diameters for the plurality of locations. The model generator constructs a stent model from the selected locations and diameters.

9 Claims, 4 Drawing Sheets

(56) References Cited

U.S. PATENT DOCUMENTS

| | | | |
|---|---|---|---|
| 2007/0049839 A1 | 3/2007 | Odry et al. | |
| 2008/0167608 A1* | 7/2008 | Rutter | A61M 25/104 604/101.02 |
| 2008/0167629 A1* | 7/2008 | Dann | A61M 25/0119 604/528 |
| 2009/0140143 A1* | 6/2009 | Fukuda | H01J 37/28 250/311 |
| 2009/0170769 A1* | 7/2009 | Jin | C07K 14/71 435/325 |
| 2010/0010503 A1* | 1/2010 | Kassab | A61B 5/0538 606/129 |
| 2010/0055093 A1* | 3/2010 | Shepard | A61P 13/10 530/391.1 |
| 2011/0196478 A1* | 8/2011 | Torosoff | A61L 31/14 623/1.36 |
| 2012/0035715 A1* | 2/2012 | Robida | A61F 2/848 623/1.36 |
| 2012/0158035 A1* | 6/2012 | Schaeffer | A61M 25/104 606/194 |
| 2013/0338530 A1* | 12/2013 | Kassab | A61B 5/1077 600/547 |
| 2014/0072610 A1* | 3/2014 | Venkatraman | A61K 47/32 427/2.25 |
| 2014/0114343 A1* | 4/2014 | Lee | A61B 17/12118 606/200 |
| 2014/0163664 A1* | 6/2014 | Goldsmith | A61B 17/0057 604/93.01 |
| 2015/0081000 A1* | 3/2015 | Hossainy | A61F 2/88 623/1.2 |
| 2015/0370926 A1 | 12/2015 | Savage et al. | |
| 2016/0019433 A1* | 1/2016 | Saito | G06V 10/95 709/203 |
| 2017/0367718 A1* | 12/2017 | Georgilis | A61F 2/958 |
| 2019/0029519 A1* | 1/2019 | Itu | G16H 40/20 |
| 2019/0247050 A1* | 8/2019 | Goldsmith | A61F 2/82 |
| 2019/0275293 A1* | 9/2019 | Lenihan | G02F 1/1368 |
| 2020/0289256 A1* | 9/2020 | Szente Varga | A61F 2/954 |
| 2022/0265353 A1* | 8/2022 | Gildea | G06T 7/0012 |
| 2024/0225451 A1* | 7/2024 | Dunham | A61B 1/01 |

FOREIGN PATENT DOCUMENTS

| | | |
|---|---|---|
| JP | 2001079097 A | 3/2001 |
| JP | 2007516771 A | 6/2007 |
| JP | 2007512107 A | 8/2007 |

OTHER PUBLICATIONS

International Search Report for corresponding Application Serial No. 2020041748.

First Office Action for corresponding Korean Patent Application No. 10-2022-7004470, Applicant: The Cleveland Clinic Foundation et al; entitled System and Method for Model-Based Stent Design and Placement, with a filing date of Feb. 9, 2022; Office Action delivery date of Dec. 6, 2024, 12 pages.

Official Notification and English Translation for Japanese Patent Application No. 2022-502024, Notification of Rejection pp. 1-7.

Japanese Office Action for Corresponding Application Serial No. 2022502024, pp. 1-3.

Notice of First Office Action for corresponding Application No. 202080055928.3, Applicant: The Cleveland Clinic Foundation; New Cos, Inc., entitled System and Method for Model-Based Stent Design and Placement, with a mailing Date of Oct. 9, 2024, 23 pages.

Australian Government Examination Report No. 2 dated Oct. 30, 2023 for corresponding application 2020309595, pp. 1-4.

The State Intellectual Property Office of the People's Republic of China Notice of Second Office Action for Application No. 202080055928.3; Applicant: The Cleveland Clinic Foundation; New Cos, Inc. with a dispatching date of May 14, 2025, 28 pages.

Affecting Factors of Support Force for Silicone Airway Stent, DOI:10.15971/j.cnki cmdi 2019-09-015; Zhong-Xu-Piao; 4 pages.

Korean Intellectual Property Office (KIPO) Notice of Decision of Final Rejection issued Aug. 27, 2025 for Korean Patent Application No. 10-2022-7004470 based on PCT/US2020/041748, filed Jul. 13, 2020.

* cited by examiner

SYSTEM AND METHOD FOR MODEL-BASED STENT DESIGN AND PLACEMENT

CROSS-REFERENCE TO RELATED APPLICATIONS

This application claims the benefit of U.S. Provisional Patent Application No. 62/872,754, filed Jul. 11, 2019, entitled SYSTEM AND METHOD FOR MODEL-BASED STENT DESIGN AND PLACEMENT. The subject matter of this application is incorporated herein by reference in its entirety.

STATEMENT REGARDING FEDERALLY SPONSORED RESEARCH

This invention was made with government support under HL119810 awarded by the National Institutes of Health. The government has certain rights in the invention.

TECHNICAL FIELD

The present disclosure relates generally to surgical planning and, more specifically, to devices, systems, and methods for model-based stent design and placement.

BACKGROUND

Airway stents, or tracheobronchial prostheses, are hollow tubes that are inserted into an airway to treat disorders of the airway, such as tracheal collapse. They are usually placed bronchoscopically. Commercially-available airway stents come in limited shapes and sizes and often poorly fit in patients with complex airways. A poorly fitted airway stent can cause a variety of complications including, but not limited to, stent occlusion, granulation tissue formation, infection, biofilm, and migration.

SUMMARY

In accordance with an aspect of the present invention, a system includes a processor and a non-transitory memory storing computer executable instructions for designing a stent for placement within an airway of a patient. The computer executable instructions are executable by the processor to provide an image segmenter, a graphic user interface, and a model generator. The image segmenter segments at least one image of a region of interest to provide a three-dimensional airway model representing at least a portion of the airway. The graphic user interface prompts a user to select a plurality of locations within the airway model and a corresponding plurality of diameters for the plurality of locations. The model generator constructs a stent model from the selected locations and diameters.

In accordance with another aspect of the present invention, a method is provided. An image of a region of interest including at least a portion of an airway of a patient is received and segmented to provide a three-dimensional model of the airway. A user is prompted to select a plurality of locations within the three-dimensional model of the airway, as well as an associated diameter for each of the plurality of locations via a graphic user interface. An initial stent model is generated from the selected locations and diameters, and the user is prompted to edit the initial stent model via the graphic user interface to provide a final stent model.

In accordance with yet another aspect of the present invention, a method is provided. A computed tomography (CT) image of a region of interest including at least a portion of an airway of a patient is received from a CT scanner. The CT image is segmented to provide a three-dimensional model of the airway. A user is prompted to select a plurality of locations within the three-dimensional model of the airway via a graphic user interface. The user is prompted to select, for each of the plurality of locations, an associated diameter via the graphic user interface. A stent model is generated from the selected locations and diameters, and the stent model is provided to one of a local fabrication system and a remote fabrication system to produce a physical instantiation of the stent model.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

In the context of the present disclosure, terms "comprises" and/or "comprising," as used herein, can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

Additionally, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "model" can refer to a representation of an object created on a computer. In some instances, the model can be a three-dimensional representation of the object.

The term "coordinate system" can refer to a system of representing points in a space of given dimensions by coordinates.

As used herein, the terms "subject" and "patient" can refer, interchangeably, to any warm-blooded organism including, but not limited to, a human being, a pig, a rat, a mouse, a dog, a cat, a goat, a sheep, a horse, a monkey, an ape, a rabbit, a cow, etc.

The present disclosure addresses the issues with existing airway stents using model-based design and placement of patient-specific airway stents. A patient-specific stent may minimize complications, improve quality of life, and reduce the need for repeated procedures. The systems and methods taught herein can be used to model a stent and determine an appropriate placement for the stent within an airway of a patient based on patient anatomy and the judgment of a physician or technician.

Figure 1:
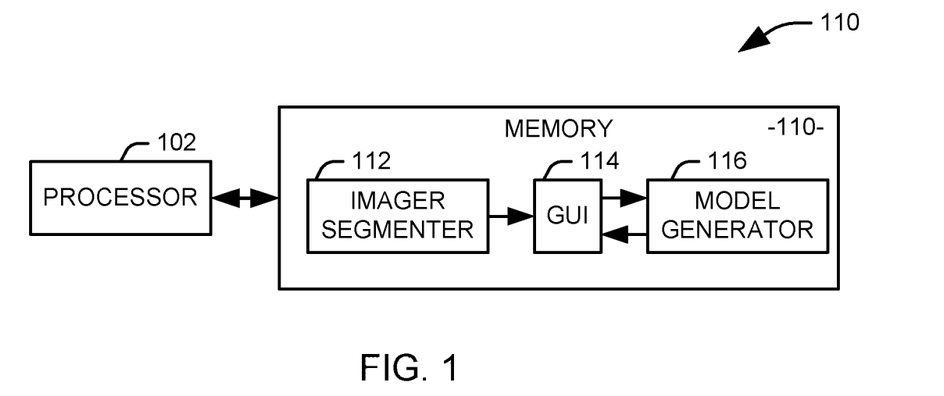
FIG. 1 illustrates a system for generating patient-specific stent models in accordance with an aspect of the present invention.

FIG. 1 illustrates a system 100 for generating patient-specific stent models in accordance with an aspect of the present invention. The system 100 includes a processor 102 and a non-transitory memory 110 storing computer executable instructions for designing a stent for placement within an airway of a patient. To this end, the executable instructions include an image segmenter 112 that segments at least one image of a region of interest to provide a three-dimensional airway model representing at least a portion of the airway. In practice, the image or images provided to the image segmenter 112 can be generated via a three-dimensional medical imaging modality, such as computed tomography (CT) or magnetic resonance imaging (MRI), or as a series of two-dimensional images from which a three-dimensional model of the airway of the patient can be constructed.

The image segmenter 112 can utilize any appropriate method for automated segmentation of the image or images. In one example, a machine learning model, trained on example images segmented by human experts, can be utilized to provide the three-dimensional airway model. Examples of appropriate machine learning systems include convolutional neural networks, recurrent neural networks, and generalized adversarial networks. In other implementations, other approaches such as energy minimization approaches, clustering approaches, and edge detection algorithms, can be used to generate the three-dimensional model of the airway.

A graphic user interface (GUI) 114 allows a user to select a plurality of locations at within the airway model and a corresponding plurality of diameters for the plurality of locations. Controls can be provided as part of the graphic user interface 114 to allow the user to rotate or zoom in or out from the model. The model can include a calculated centerline for the airway in the three-dimensional model for reference by the user. In a first stage of the stent design, each of the plurality of locations can represent a significant point on the stent, such as an end of the stent or a point at which multiple branches of the stent meet. In one implementation, the user is prompted to select four initial locations and corresponding diameters, representing a proximal end of the stent, a primary distal end of the stent, a secondary distal end of the stent, and a join location for first and second branches represented by the primary and secondary distal ends of the stent. It will be appreciated, however, that the initial selection can include more or fewer initial locations.

Once the initial locations are selected, a model generator 116 constructs a stent model from the selected locations and diameters. In one example, the model generator 116 represents each selected location and diameter as the base of a cylinder and connects the locations using a cylindrical mesh to provide the initial stent model. In one implementation, a centerline of the stent is selected to track a centerline of the model of the patient's airway, although it will be appreciated that a certain degree of smoothing can be applied to avoid rapid deviation in the centerline of the stent. The diameter of the cylindrical mesh at points between the selected locations can be determined, for example, via a polynomial or spline interpolation between the two locations.

In one example, the user can select additional locations within the initial stent design. Each location can be selected to change a diameter of the stent at a given point, to add an additional branch to the stent, and change angles of branches at selected locations within the initial stent design. Branches can be color coded to ensure that the user is aware of which branch is selected for editing at any given time. The stent thickness, inner diameter, and outer diameter can also be viewed at a selected point and edited via this interface, either by directly entering a value, in which case the inner stent diameter remains fixed and the outer diameter is adjusted, or by changing either or both of the inner and outer stent diameters at a given point. The thickness of the stent model can also be adjusted globally. Once the user is satisfied with the stent model, it can be saved for display for a user or transmission to a local or remote fabrication system for fabricating the stent.

Figure 2:
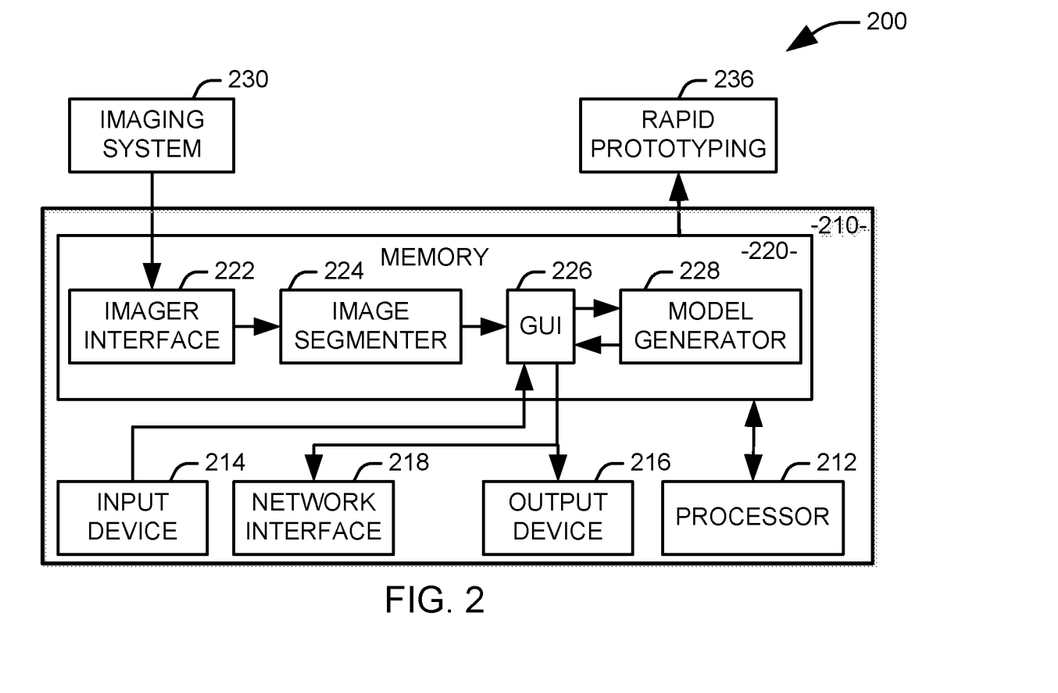
FIG. 2 illustrates an example of a system that facilitates design of a patient-specific stent for placement within an airway of a patient.

FIG. 2 illustrates an example of a system 200 that facilitates design of a patient-specific stent for placement within an airway of a patient. The system 200 includes a computing device 210 that includes a processor 212, an input device 214, an output device 216, a network interface 218, and a non-transitory medium 220. In the illustrated example 200, the computing device 210 utilizes the non-transitory memory 220 to store computer-executable instructions and the processor 212 to execute the computer-executable instructions to facilitate the performance of operations and/or implement the functions of one or more of components of the system, and specifically to design a stent for placement within an airway of a patient. The input device 214 can include, for example, one or more of a touchscreen, a mouse, a trackball, a keyboard, a microphone, and a gesture recognition interface. The output device 216 can include, for example, one or more of a display, a speaker, and a printer.

The computing device 210 can be a general-purpose computer, special purpose computer, and/or other programmable data processing apparatus. Accordingly, the non-transitory memory 220 can be any non-transitory medium that is not a transitory signal and can contain or store the program for use by or in connection with the instruction or execution of a system, apparatus, or device. For example, the non-transitory memory 220 can be an electronic, magnetic, optical, electromagnetic, infrared, semiconductor system, apparatus or device, a portable computer diskette, a random access memory, a read-only memory; an erasable programmable read-only memory (or Flash memory), or a portable compact disc read-only memory.

The non-transitory memory 220 can store components of the stent design tool that are executable by the processor 212, including an imager interface 222, an image segmenter 224, a graphic user interface (GUI) 226, and a model generator 228. An imager interface 222 receives images of a region of interest from an associated imaging system 230. In one implementation, the imaging system 230 is a computed tomography (CT) imaging system that provides one or more CT images to the imager interface, although it will be appreciated that the imaging system 230 can comprise any imaging system capable of providing three-dimensional models of an airway of a patient. In one example, the imager interface 222 also receives a date on which each image was acquired, compares the date to a threshold date, and notifies a user if the date on which a given image was acquired precedes the threshold date.

An image segmenter 224 segments at least one image of the region of interest to provide a three-dimensional airway model representing at least a portion of the airway. The image segmenter 224 can use any appropriate means for determining the boundaries of the airway within the received images. In one implementation, the image segmenter 224 includes a convolutional neural network, trained on CT images that have been segmented by a human expert, that produces the segmented airway model from the received CT images.

A graphic user interface (GUI) 226 allows a user, such as a physician or technician, to determine a placement and size of the stent within the airway. In particular, the graphic user interface 226 allows the user to select a set of locations and associated diameters within the three-dimensional airway model to provide a set of anchor points for an initial stent model. In the illustrated implementation, the graphic user interface 226 prompts the user to select two locations within the model of the airway, including a first location, representing a proximate end of the stent, and a second location representing a distal end of the stent. In another implementation, the graphic user interface 226 prompts the user to select four locations within the model of the airway, including a first location, representing a proximate end of the stent, a second location representing a primary distal end of the stent, a third location representing a secondary distal end of the stent, and a fourth location at which the branches of the stent are expected to meet. The user can also select associated diameters for each selected location.

A model generator 228 constructs an initial stent model from the selected locations and diameters. In one example, a cylindrical mesh can be generated from a first end of the stent to the second end, with the diameter of the stent being a weighted linear combination of the selected first and second diameters, with the weights for each point determined from the distances from that point to each of the first and second ends of the stent. For example, the model generator 228 can determine the diameter, $d_p$, at a given point between the first location and the second location as $$d_p = d_1 + (d_2 - d_1) * \frac{l_{1,p}}{l_{1,2}},$$

where $d_1$ is the first diameter, $d_2$ is the second diameter, $l_{1,2}$ is the distance between the first location and the second location, and $l_{1,2}$ is the distance between the given point and the first location. In another example, for a branching stent, at each end location, a cylindrical mesh with the selected diameter can be generated with the cylindrical meshes meeting at the fourth location. In one implementation, the cylindrical mesh follows the centerline of the airway, although other algorithms, such as a spline approach, can be applied to a set of points selected on the three-dimensional airway model to generate the centerline and diameter of the cylindrical mesh at each point based on the selected locations and diameters.

The initial stent model is then displayed to the user via the graphic user interface 226 for further editing. The user can add additional locations and diameters to the stent model to vary the diameters or angle within a given end of the stent, change the wall thickness of the stent, and otherwise change the configuration of the stent. In one implementation, users can place markers in the airway representing conditions within the airway that could cause stricture within the airway. In response to these markers, a thickness of the stent could be altered, based on the specific diagnosis at each region. For example, a tumor growing in the airway will require more radial force to hold it open that a disease that causes inflammation in the airway tissue. Each diagnosis can have a default stent wall thickness and width, representing a length of the stent that should be altered in response to a given diagnosis marker, that is used by the model generator 228 to generate the initial model, and the user can alter the thickness in the initial model via the graphic user interface 226. Once the user has finished editing the stent model, the user can approve the model via the graphic user interface 226. The approved model can be provided to a manufacturer via the network interface 218 or provided to a rapid prototyping system 236, such as a 3-D printer, to obtain a stent for use in the patient's airway.

Figure 3:
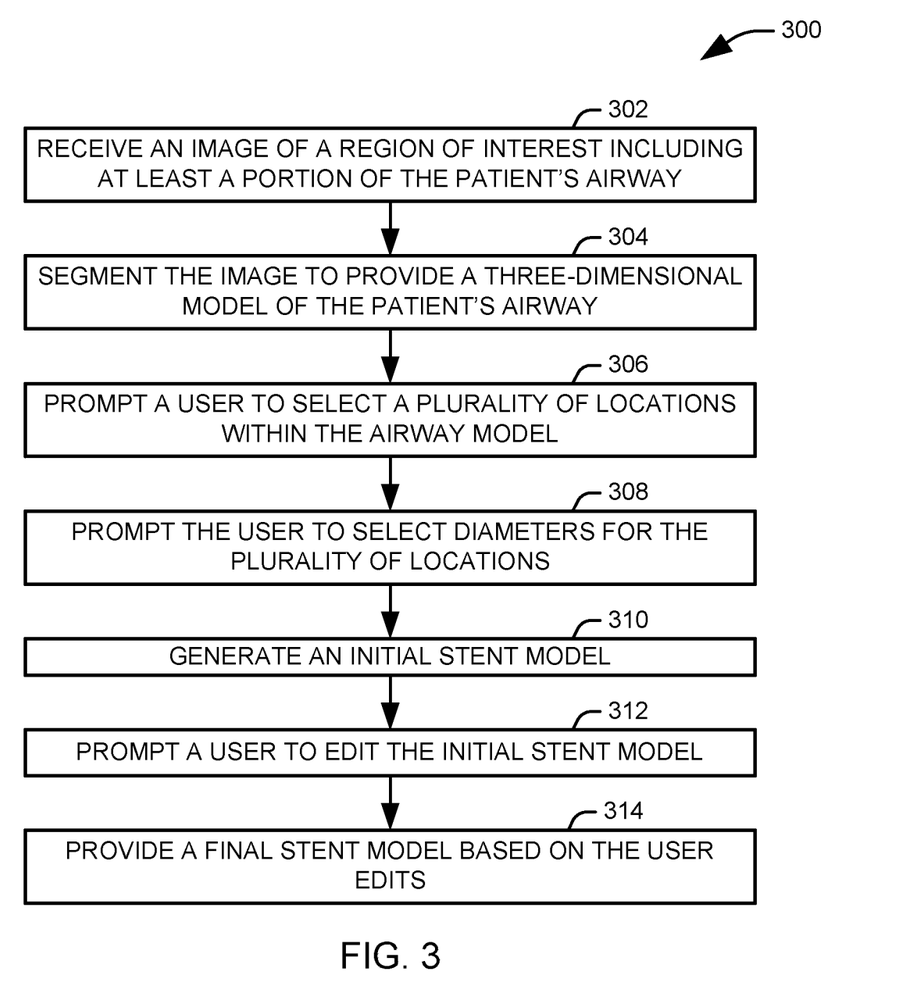
FIG. 3 illustrates a method for generating a model for a patient-specific airway stent.
Figure 4:
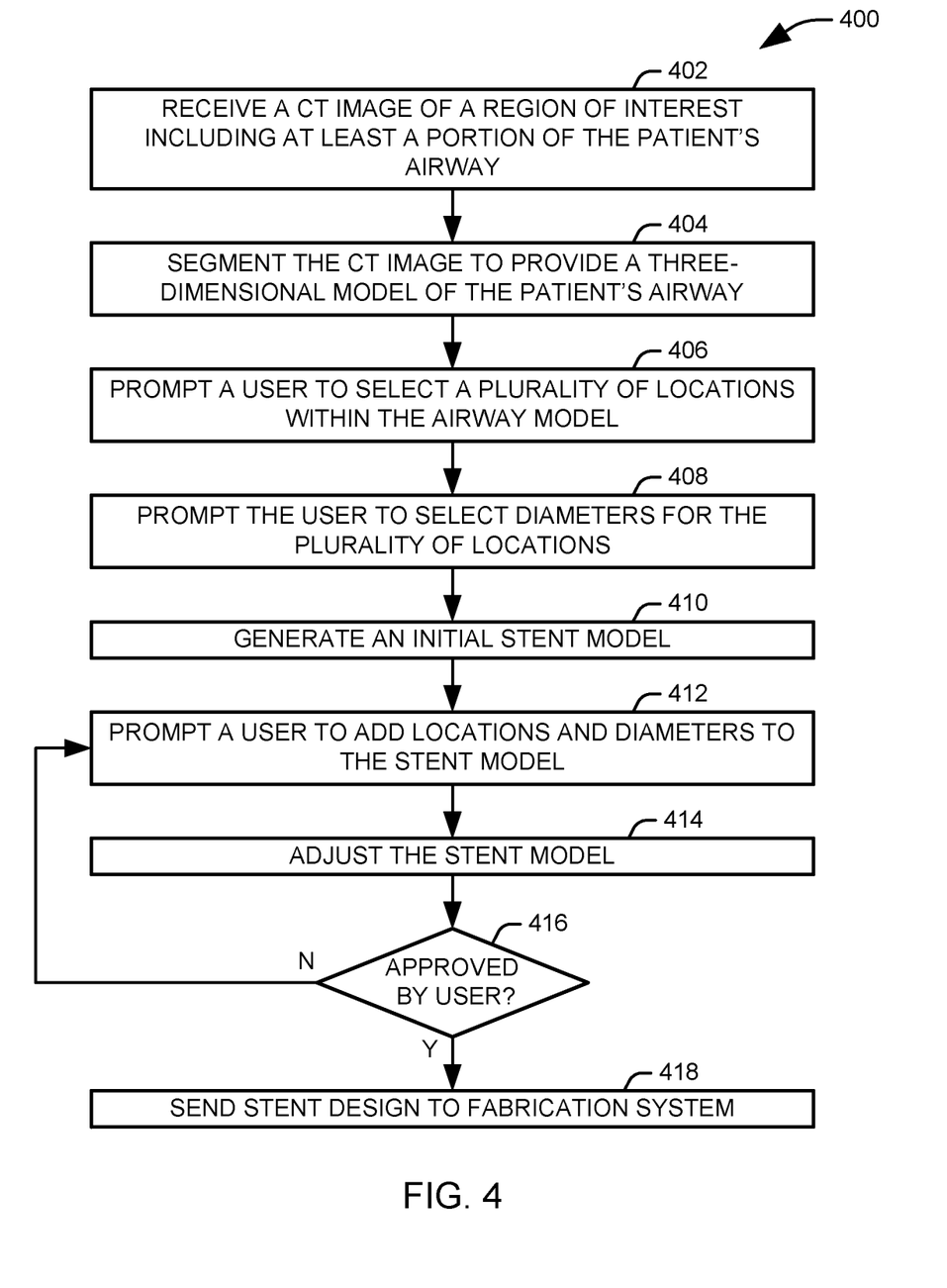
FIG. 4 illustrates a method for generating a patient-specific model for an airway stent.

Another aspect of the present disclosure can include methods for generating a stent for a patient's airway, as shown in FIGS. 3 and 4. The methods of FIGS. 3 and 4 are illustrated as process flow diagrams with flowchart illustrations. For purposes of simplicity, the methods are shown and described as being executed serially; however, it is to be understood and appreciated that the methods in the present disclosure are not limited by the illustrated order as some steps could occur in different orders and/or concurrently with other steps shown and described herein. Moreover, not all illustrated aspects may be required to implement the methods.

One or more blocks of the flowchart illustration, and combinations of blocks in the block flowchart illustrations, can be implemented by computer program instructions. These computer program instructions can be stored in memory and provided to a processor of a general purpose computer, special purpose computer, and/or other programmable data processing apparatus to produce a machine, such that the instructions, which execute via the processor of the computer and/or other programmable data processing apparatus, create mechanisms for implementing the steps/acts specified in the flowchart blocks and/or the associated description. In other words, the steps/acts can be implemented by a system comprising a processor that can access the computer-executable instructions that are stored in a non-transitory memory.

The methods can be implemented in hardware and/or in software (including firmware, resident software, microcode, etc.). Furthermore, aspects of the present disclosure may take the form of a computer program product on a computer-usable or computer-readable storage medium having computer-usable or computer-readable program code embodied in the medium for use by or in connection with an instruction execution system. A computer-usable or computer-readable medium may be any non-transitory medium that can contain or store the program for use by or in connection with the instruction or execution of a system, apparatus, or device. As an example, executable code for performing the methods can be stored in a non-transitory memory of a computing device and executed by a processor of the computing device and/or another computing device.

FIG. 3 illustrates a method 300 for generating a model for a patient-specific airway stent. At 302, an image of a region of interest including at least a portion of an airway of a patient is received. In one example, the image is a computed tomography image of the neck and upper chest of the patient, but any appropriate medical imaging technique for generating a three-dimensional model of an airway can be used. At 304, the image is segmented to provide a three-dimensional model of the airway. At 306, a user is prompted to select a plurality of locations within the three-dimensional model of the airway via a graphic user interface. In one example, the plurality of locations each represent one of an end of the stent model and a join point at which branches of the stent model meet.

At 308, the user is prompted to select, for each of the plurality of locations, an associated diameter via the graphic user interface. At 310, an initial stent model from the selected locations and diameters. For example, a cylindrical mesh can be generated to connect the selected locations using the diameters at the selected location to determine an appropriate diameter for the cylinder connecting each pair of connected locations. At 312, the user is prompted to edit the initial stent model via the graphic user interface to provide a final stent model. For example the user can be prompted to add additional locations and diameters to the initial stent model, an angle of at least a portion of the model or adjust a thickness of all or a portion of the model. The model can then be altered and presented to the user at 314. In one example, this process is repeated, until the user approves a final stent model as an output of the system. The final stent model can be provided to one of a local fabrication system and a remote fabrication system to produce a physical instantiation of the final stent model.

Referring now to FIG. 4, a method 400 is illustrated for generating a patient-specific model for an airway stent. At 402, a computed tomography (CT) image of a region of interest including at least a portion of the patient's airway is received. At 404, the image is segmented to provide a three-dimensional model of the patient's airway. At 406, a graphical user interface (GUI) allows a user to select a plurality of locations within the airway model, representing, for example, two or more ends of the stent and, where present, a join point at which branches of the stent meet. At 408, the user is allowed, via the GUI, to select associated diameters for each location. At 410, an initial stent model is generated from the selected locations and diameters, with each branch of the stent having a diameter derived from the diameter selected for its end location.

At 412, the user is allowed to add additional locations and diameters to the stent. A thickness of the stent material can also be altered at this stage. At 414, the stent model is adjusted according to the input from the user. For example, the angle of the stent can be adjusted as well as the diameter of the stent in the region around the added locations. At 416, it is determined if the user approves the stent. If not (N), the method returns to 412 to allow the user to make additional changes to the stent design. If the stent is approved (Y), the stent design is sent to a local or remote manufacturing system for fabrication as a physical instantiation of the stent design at 418. This physical stent can then be placed in the airway of the patient to treat a disorder of the airway.

Figure 5:
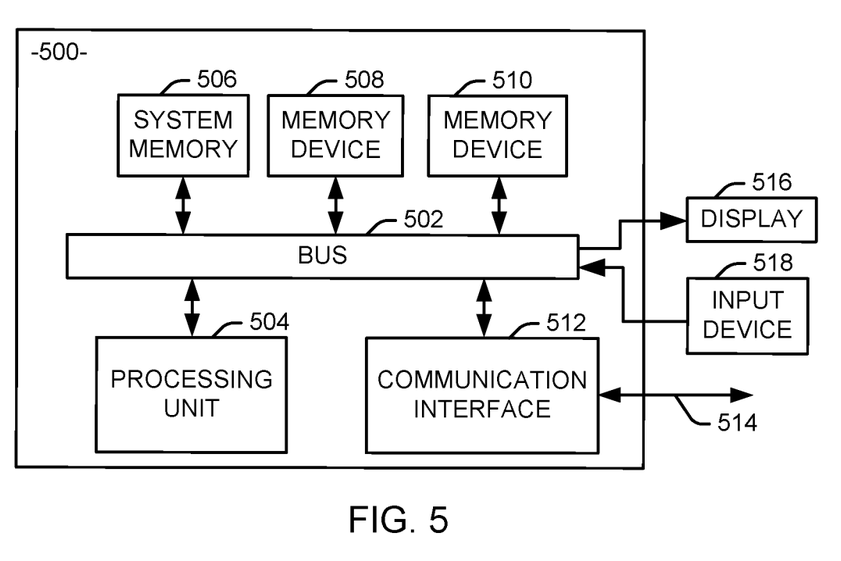
FIG. 5 is a schematic block diagram illustrating an exemplary system of hardware components capable of implementing examples of the systems and methods disclosed in FIGS. 1-4.

FIG. 5 is a schematic block diagram illustrating an exemplary system 500 of hardware components capable of implementing examples of the systems and methods disclosed herein. The system 500 can include various systems and subsystems. The system 500 can be a personal computer, a laptop computer, a workstation, a computer system, an appliance, an application-specific integrated circuit (ASIC), a server, a server BladeCenter, a server farm, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard, touch screen, and/or a mouse). The system bus 502 can be in communication with the processing unit 504 and the system memory 506. The additional memory devices 508 and 510, such as a hard disk drive, server, standalone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508, and 510 can store data, programs, instructions, database queries in text or compiled form, and any other information that may be needed to operate a computer. The memories 506, 508 and 510 can be implemented as computer-readable media (integrated or removable), such as a memory card, disk drive, compact disk (CD), or server accessible over a network. In certain examples, the memories 506, 508 and 510 can comprise text, images, video, and/or audio, portions of which can be available in formats comprehensible to human beings. Additionally or alternatively, the system 500 can access an external data source or query source through the communication interface 512, which can communicate with the system bus 502 and the communication link 514.

In operation, the system 500 can be used to implement one or more parts of a system for generating a patient-specific model for an airway stent in accordance with the present invention. Computer executable logic for implementing the system resides on one or more of the system memory 506, and the memory devices 508 and 510 in accordance with certain examples. The processing unit 504 executes one or more computer executable instructions originating from the system memory 506 and the memory devices 508 and 510. The term "computer readable medium" as used herein refers to a medium that participates in providing instructions to the processing unit 504 for execution. This medium may be distributed across multiple discrete assemblies all operatively connected to a common processor or set of related processors. Specific details are given in the above description to provide a thorough understanding of the embodiments. However, it is understood that the embodiments can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system for designing and fabricating a stent for placement within an airway of a patient, the system comprising:
   a processor; and
   a non-transitory memory storing computer executable instructions for designing a stent for placement within an airway of a patient, the computer executable instructions comprising:
   an image segmenter that segments at least one image of a region of interest to provide a three-dimensional airway model representing at least a portion of the airway;
   a graphic user interface that prompts a user to select a plurality of locations within the airway model and a corresponding plurality of diameters for the plurality of locations, the graphic user interface further allowing the user to place a diagnosis marker representing a stricture in the airway; and
   a model generator that constructs a stent model from the selected locations and diameters, the model generator selecting a wall thickness for at least a portion of the stent model according to a location and identity of the diagnosis marker; and
   a rapid manufacturing system configured to fabricate an airway stent based on the stent model.

2. The system of claim 1, wherein the model generator is configured to generate the stent model as a cylindrical mesh that extends from a first location of the plurality of locations to a second location of the plurality of locations following a centerline of the three-dimensional airway model, with a diameter of the cylindrical mesh at a given point between the first location and the second location being a function of a first diameter associated with the first location, a second diameter associated with the second location, a distance between the first location and the second location, and a distance of the given point from the first location.

3. The system of claim 1, wherein the model generator is configured to generate the stent model as a cylindrical mesh that extends from a first location of the plurality of locations to a second location of the plurality of locations, the cylindrical mesh having a diameter and centerline determined using to a spline interpolation applied a set of points selected on the three-dimensional airway model, a first diameter associated with the first location, and a second diameter associated with the second location.

4. The system of claim 1, wherein the plurality of locations includes a first location, representing a proximate end of the stent, a second location representing a primary distal end of the stent, a third location representing a secondary distal end of the stent, and a fourth location at which a first branch of the stent, associated with the primary distal end, and a second branch of the stent, associated with the secondary distal end, meet.

5. The system of claim 1, further comprising a network interface configured to provide the stent model to a remote computer system.

6. The system of claim 1, further comprising a computed tomography (CT) scanner that provides the at least one image of the region of interest as CT images.

7. The system of claim 1, wherein the image segmenter comprises a convolutional neural network trained on images segmented by a human expert, the convolutional neural network receiving the at least one image of the region of interest and providing the three-dimensional airway model as an output.

8. The system of claim 1, further comprising an imager interface that receives the at least one image of a region of interest from the scanner along with a date on which each of the at least one image was acquired, the imager interface comparing the date to a threshold date and notifying a user if the date on which any of the at least one image was acquired precedes the threshold date.

9. The system of claim 1, wherein the stent model and the three-dimensional airway model are displayed to the user, and the user is prompted to edit the stent model via the graphic user interface to change one of a thickness of the stent model and a diameter of the stent model at a selected point.

* * * * *